Aug. 21, 1956 W. M. HALL 2,760,186
VISUAL INDICATING DEVICES
Filed April 9, 1953
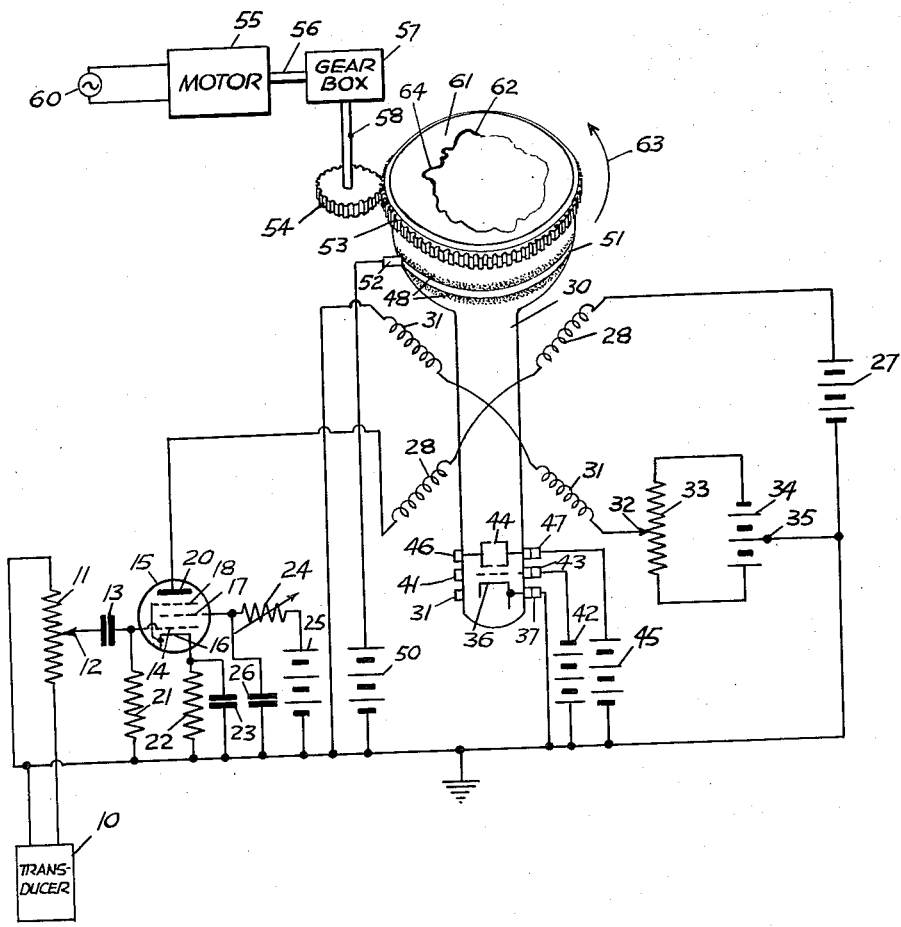
INVENTOR
WILLIAM M. HALL
BY Elmer J. Gorn
ATTORNEY

United States Patent Office 2,760,186
Patented Aug. 21, 1956

2,760,186

VISUAL INDICATING DEVICES

William M. Hall, Lexington, Mass., assignor to Raytheon Manufacturing Company, Newton, Mass., a corporation of Delaware Application April 9, 1953, Serial No. 347,785

8 Claims. (Cl. 340—367)

This invention relates to a device for visually indicating the variations of a condition over a period of time, and more particularly to a visual indicating stethoscope.

It is often desirable to have a visual indication of the magnitude of a condition at a given instant and for the immediately preceding period of time. This is particularly true of the heart beats of a patient on the operating table. It is particularly useful to the surgeon and the anaesthetist to have a visual display simultaneously available to them of the patient's heart beats while he is on the operating table. This can be done by utilizing the variations in the condition of interest, such as heart beats or pulse beats, to drive a stylus that inscribes a track on film. This track can then be continuously projected to give a visual indication of the heart beats. However, such a mechanical system has a limited frequency response and the required equipment is likely to be bulky.

The present invention provides such a visual indication on the face of a cathode ray tube having a long persistence phosphor on its screen and arrangements to rotate the tube at a rate determined by the period of time that is of interest. An electrical current that is a function of the physical displacements caused by heart beats, pulses, breathing, or other phenomena of interest is obtained by means of a transducer and applied after amplification, if necessary, to a set of deflection coils on the cathode ray tube. The tube is rotated at a speed such that one revolution takes place in the time that is of interest. For this purpose, the tube can be rotated by a motor through reduction gearing. The result is a display in which the variation of the quantity indicated is represented by a radial displacement of the beam and time by an angular displacement from a predetermined starting position, such as the top of the tube face, when it is positioned vertically. Thus, an indication of the continuous value of a quantity to be measured and its variations over a predetermined period of time are readily made available by the apparatus of this invention.

Other and further advantages and features of the invention will become apparent from the following description, reference being had to the drawing, wherein the single figure is a schematic circuit diagram of a preferred embodiment of the invention.

In the drawing, the reference numeral 10 indicates a transducer adapted to produce a voltage that is a function of a quantity to be indicated, such as heart beats. The output of the transducer 10 is applied across a variable impedance 11, the tap 12 of which is coupled through a capacitor 13 to the control grid 14 of a pentode 15. The pentode also has a cathode 16, a screen grid 17, a suppressor grid 18, and a plate 20. The grid 14 is connected to the cathode 16 through resistors 21 and 22. Resistor 22 is shunted by a by-pass capacitor 23. The screen grid 17 is also connected to the cathode 16 through a variable resistor 24 and a source of positive potential 25, and the resistor 22. Resistor 24 and battery 25 are shunted by a by-pass capacitor 26. The supressor grid 18 is connected directly to the cathode. The plate 20 is connected to a source 27 of positive potential through the deflection coils 28 of a cathode ray tube 30. These deflection coils provide vertical deflection, as seen in the drawing. The signal from the transducer 10 amplified in the tube 15 and the bias developed across the cathode resistor 22 determine the current through the coils 28 and thus the amount of vertical deflection of the electron beam. The beam is also positioned vertically by the screen voltage as determined by the variable dropping resistor 24 and the source 25. The beam is positioned horizontally by a set of deflection coils 31 supplied with current from arm 32 of a potentiometer 33 connected across a source of potential 34 that has a tap 35 returned to the cathode 36 of the cathode ray tube 30 through a brush 37 and commutator ring 38. The grid 40 of the cathode ray tube 30 is brought out to a commutator ring 41 and connected to a source 42 of negative potential through a brush 43. The first anode 44 of the cathode ray tube 30 is connected to a source 45 of positive potential through a commutator ring 46 and brush 47. The second anode 48 of the cathode ray tube 30 is connected to a source 50 of positive potential through a commutator ring 51 and brush 52. The cathode ray tube 30 is adapted for rotation by an annular gear 53 that meshes with a gear 54 driven by a motor 55 through a shaft 56, a gear box 57, and a second shaft 58. The motor 55 is supplied with current by a generator 60. The face 61 of a cathode ray tube 30 is coated with a layer of phosphor chosen to have a persistence approximately equal to the time required for the tube 30 to make one revolution and this time and thus the speed of the motor and gear ratios are determined by the period of time that it is desired to display the heart beats or other phenomena.

In operation, the heart beats of the patient are picked up by the transducer 10 and the resulting current after amplification in the amplifier tube 15 is applied to the deflection coil 28 of the cathode ray tube 30 which produces a spot 62 on the face 61 of the cathode ray tube located by the deflection system. This spot moves vertically with the heart beats at the same time that the tube is being rotated in the direction shown by the arrow 63, with the result that a trace 64 is formed on the face 61 of the cathode ray tube 30 that varies about a circle. This trace is brightest when first formed and gradually fades out. This is represented in the drawing by the trace 64 being wider near the point 62 and gradually narrowing around the circle until it completely disappears as it approaches the point 62. As a result, new information about the patient's heart beats is constantly being written at the top of the tube and disappears as that portion of the face of the tube approaches the starting point, so that the indication can be replaced by the new information that always appears at one position on the display, preferably the top. With such an indicator in the operating room, the anaesthetist and the surgeon have constantly available to them instantaneous information of the heart beats of the patient and the history of those heart beats over an immediately preceding time.

This invention is not limited to the particular details of construction, materials and processes described, as many equivalents will suggest themselves to those skilled in the art. For instance, electrostatic deflection could be used but magnetic deflection is more convenient. A triode could be used instead of the pentode shown. It is, accordingly, desired that the appended claims be given a broad interpretation commensurate with the scope of the invention within the art.

What is claimed is:

1. Visual indicating means comprising a cathode ray tube having an electron beam emitting and forming structure, a luminescent screen and deflection means adapted to sweep the beam of the cathode ray tube radially, means to rotate said cathode ray tube about its longitudinal axis, a source of signals to be indicated and means to vary the deflection under control of said signals to give a presentation of the variations of signals as radial displacements of a luminous line on the face of the tube.

2. Visual indicating means comprising a cathode ray tube having an electron beam emitting and forming structure, a persistent luminescent screen and deflection means adapted to sweep the beam of the cathode ray tube radially, means to rotate said cathode ray tube about its longitudinal axis, a source of signals to be indicated and means to vary the deflection under control of said signals to give a presentation of the variations of signals as radial displacements of a luminous line on the face of the tube.

3. Visual indicating means comprising a cathode ray tube having an electron beam emitting and forming structure, a luminescent screen and electromagnetic deflection means adapted to sweep the beam of the cathode ray tube radially, means to rotate said cathode ray tube about its longitudinal axis, a source of signals to be indicated and means to vary the deflection under control of said signals to give a presentation of the variations of signals as radial displacements of a luminous line on the face of the tube.

4. Visual indicating means for compressional wave energy comprising a cathode ray tube having an electron beam emitting and forming structure, a luminescent screen and deflection means adapted to sweep the beam of the cathode ray tube radially, means to rotate said cathode ray tube about its longitudinal axis, means for converting the compressional wave energy to be indicated into variations in an electric current and means to vary the deflection under control of said current to give a presentation of the variations of the compressional wave energy as radial displacements of a luminous line on the face of the tube.

5. Visual indicating means comprising a cathode ray tube having an electron beam emitting and forming structure, a persistent luminescent screen and electromagnetic deflection means adapted to sweep the beam of the cathode ray tube radially, means to rotate said cathode ray tube about its longitudinal axis, a source of signals to be indicated and means to vary the deflection under control of said signals to give a presentation of the variations of signals as radial displacements of a luminous line on the face of the tube.

6. Visual indicating means for compressional wave energy comprising a cathode ray tube having an electron beam emitting and forming structure, a persistent luminescent screen and deflection means adapted to sweep the beam of the cathode ray tube radially, means to rotate said cathode ray tube about its longitudinal axis, means for converting the compressional wave energy to be indicated into variations in an electric current and means to vary the deflection under control of said current to give a presentation of the variations of the compressional wave energy as radial displacements of a luminous line on the face the tube.

7. Visual indicating means for compressional wave energy comprising a cathode ray tube having an electron beam emitting and forming structure, a luminescent screen and electromagnetic deflection means adapted to sweep the beam of the cathode ray tube radially, means to rotate said cathode ray tube about its longitudinal axis, means for converting the compressional wave energy to be indicated to variations in an electric current and means to vary the deflection under control of said current to give a presentation of the variations of the compressional wave energy as radial displacements of a luminous line on the face of the tube.

8. Visual indicating means for compressional wave energy comprising a cathode tube having an electron beam emitting and forming structure, a persistent luminescent screen and electromagnetic deflection means adapted to sweep the beam of the cathode ray tube radially, means to rotate said cathode ray tube about its longitudinal axis, means for converting the compressional wave energy to be indicated to variations in an electric current and means to vary the deflection under control of said current to give a presentation of the variations of the compressional wave enery as radial displacements of a luminous line on the face of the tube.

References Cited in the file of this patent

UNITED STATES PATENTS

| | | |
|---|---|---|
| 2,027,393 | McCreary | Jan. 14, 1936 |
| 2,468,714 | Leverenz | Apr. 26, 1949 |
| 2,566,332 | Huber et al. | Sept. 4, 1951 |